United States Patent [19]
Collins

[11] 4,139,134
[45] Feb. 13, 1979

[54] APPARATUS FOR PRODUCING CATALYST PELLETS OF UNIFORM SIZE

[75] Inventor: Charles G. Collins, Houston, Tex.
[73] Assignee: Shell Oil Company, Houston, Tex.
[21] Appl. No.: 776,340
[22] Filed: Mar. 10, 1977

Related U.S. Application Data

[63] Continuation-in-part of Ser. No. 621,710, Oct. 14, 1975, abandoned.

[51] Int. Cl.² .............................................. B26F 3/00
[52] U.S. Cl. ................................... 225/97; 83/307.1; 83/347; 83/444; 83/651.1; 83/906; 225/103
[58] Field of Search .................... 83/347, 651.1, 906, 83/444, 346, 672, 307.1, 673, 663; 425/294; 225/97, 103, 93

[56] References Cited

U.S. PATENT DOCUMENTS

| 422,657 | 3/1890 | Swenson | 83/673 X |
|---|---|---|---|
| 1,580,916 | 4/1926 | Putt | 83/672 X |
| 1,580,918 | 4/1926 | Putt | 83/672 X |
| 3,119,312 | 1/1964 | Henc | 83/347 X |
| 3,205,745 | 9/1965 | Hammer et al. | 83/444 |
| 3,317,100 | 5/1967 | Flemming et al. | 225/97 |
| 3,583,267 | 6/1971 | Topolski et al. | 83/906 X |
| 3,644,109 | 2/1972 | Klink et al. | 83/347 X |
| 3,789,715 | 2/1974 | Schuchardt et al. | 83/346 X |
| 3,880,030 | 4/1975 | Rosengren | 425/294 X |

FOREIGN PATENT DOCUMENTS 2137544 3/1973 Fed. Rep. of Germany ............ 83/906

Primary Examiner—Frank T. Yost

[57] ABSTRACT

A catalyst strand sizer is described which produces catalyst pellets of uniform preselected length without producing an excessive amount of fines. The catalyst sizers comprises two fixed rotatable rolls wherein one roll has a compressible surface and the other roll is covered with a wire mesh of selected dimensions whereby when the catalyst strand extrudate is passed between said rolls, the strands are broken into catalyst pellets of preselected length.

5 Claims, 2 Drawing Figures

APPARATUS FOR PRODUCING CATALYST PELLETS OF UNIFORM SIZE

This application is a continuation-in-part of copending application Ser. No. 621,710, filed Oct. 14, 1975 now abandoned.

BACKGROUND OF THE INVENTION

1. Field of the Invention

The present invention is directed to a method and apparatus for preparing catalyst pellets of uniform preselected length.

2. Description of the Prior Art

Catalyst pellets may be prepared by mixing an inert carrier such as clay, alumina, carbon, etc., with or without an active catalyst component so as to form a mulled mixture. The resulting mixture is then extruded through dies having a nominal diameter of generally from about 1/32" to about ¼" in diameter. During extrusion the strands break off in a non-uniform length while dropping to a conveyor belt en route to a dryer, usually a rotating tray dryer. Following the dryer, the strands are passed over a sizing screener where all material over, and sometimes under, a preselected length is rejected from the product stream to be discarded and/or further reduced in length.

Another method comprises extruding the catalyst extrudate through dies to produce the so-called "longs". These longs are charged to a ribbon blender where the strand lengths are reduced by attrition. This procedure results in non-uniform catalyst strands and the production of an excessive amount of fines which are generally unrecoverable. Such waste and further handling may account to as much as 50% of the stream, which is excessive.

It is therefore desirable to be able to produce catalyst pellets having a relatively uniform length from strands in high yield with a concommittant reduction in the production of unusable fines.

An apparatus and method has now been discovered wherein catalyst strands are uniformly sized to a preselected length without the production of an excessive amount of fines.

SUMMARY OF THE INVENTION

The present invention provides an improved catalyst pellet or strand sizer comprising (1) means for aligning long catalyst strands for feeding said strands, hereinafter called "longs", to the nip of a set of fixed rolls, (2) two fixed rolls wherein one roll has a compressible surface and the other roll is embossed on its surface to preselected dimensions and (3) means for rotating said rolls so that the longs passing through the nip of said rolls are broken, cut or otherwise severed to produce catalyst pellets of a preselected length.

DESCRIPTION OF THE PREFERRED EMBODIMENT

It will be appreciated that the preparation of the catalyst extrudate or catalyst "longs" or their respective composition forms no part of the present invention. Also, subsequent treatment of the catalyst pellets form no part of the present invention. Accordingly, the present invention is directed solely to a method and apparatus for sizing preformed catalyst extrudates to produce catalyst pellets of a preselected dimension, particularly length.

Figure 1:
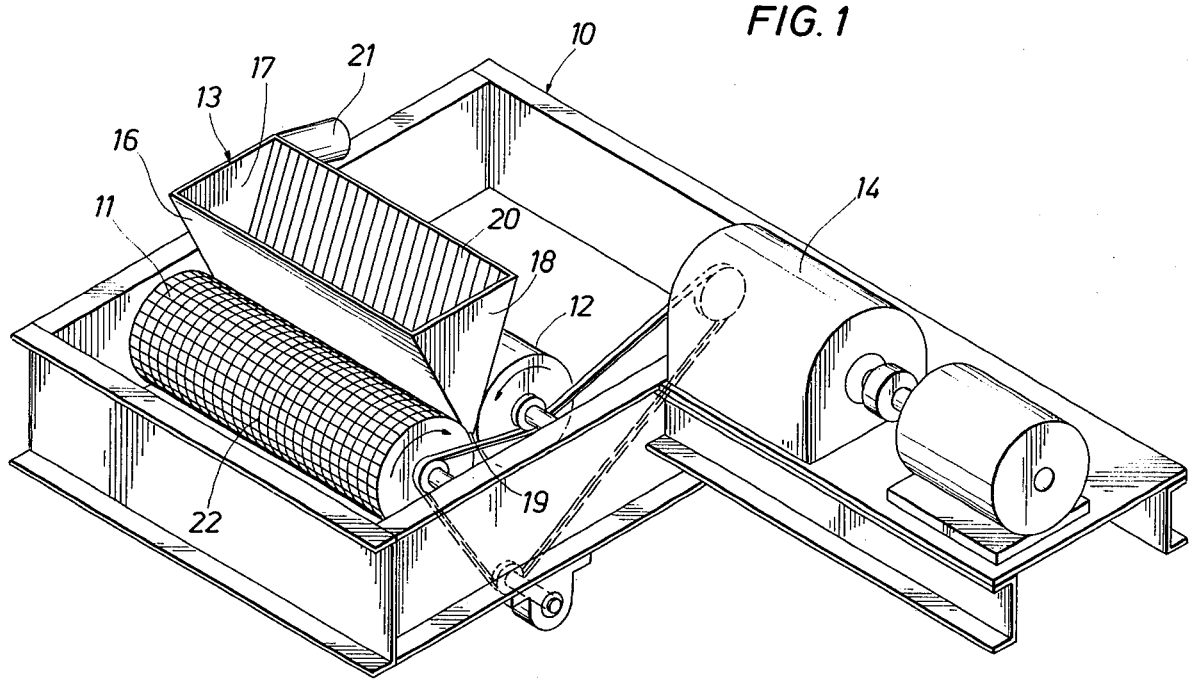
FIG. 1 is a perspective view of the present apparatus for producing or sizing catalyst strands to produce catalyst pellets of uniform size.

Reference is made to the FIG. 1 which is a perspective view of the instant apparatus which comprises a frame 10 with two rollers 11 and 12 mounted thereon, means 14 for revolving rollers 11 and 12 and feed chute 13 adapted to feed catalyst strands 25 to the nip of rollers 11 and 12.

Figure 2:
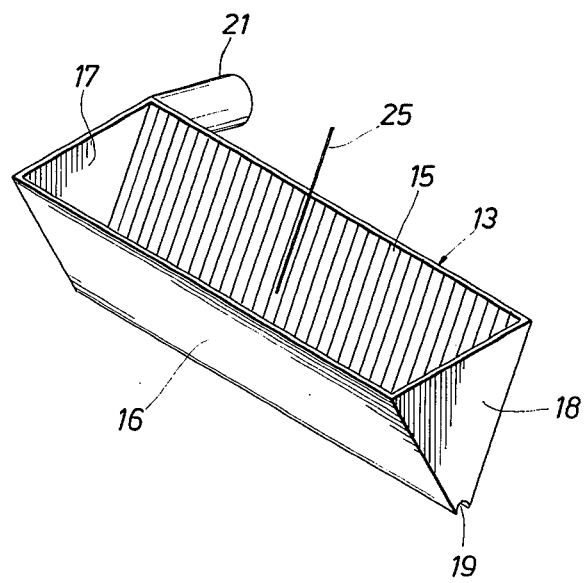
FIG. 2 is a perspective view of the feed chute.

Reference is now made to FIG. 2. Feed chute 13 is preferably an open top hopper having two parallel sides 17 and 18 and two sides 15 and 16 sloping inwardly from the top and terminating at the bottom in a slit 19 having an effective opening or width of slightly larger than the diameter of the catalyst strands. The slope of sides 15 and 16 and the width of slit 19 may be adjustable so as to accommodate difference diameters of non-flexible, solid catalyst longs. Side 15 of feed chute 13 on its inward surface has grooves or vee-shaped corrugations starting at the top of side 15 and terminating at the bottom in slit 19, said corrugations 20 being parallel to sides 17 and 18 of feed chute 13. Side 16 may also be corrugated as is side 15. Corrugations or grooves 20 are sized to effectively guide or feed catalyst strands 25 with their axes in a line normal to slit 19. Feed chute 13 is positioned above rollers 11 and 12 with slit 19 parallel to the line formed by the nip of rollers 11 and 12 so that brittle catalyst strands 25 are effectively fed from corrugations or grooves 20 through slit 19 into the nip of rollers 11 and 12 with the axes of the longs perpendicular to the line formed by the nip where they are severed or broken into uniform lengths.

The effective width of slit 19 will depend upon the diameter of catalyst longs, the specific geometrical configuration of corrugations 20 as well as the slope of sides 15 and 16. This "effective width" is defined as a width which just permits the catalyst longs to pass through the slit without binding. This effective width may be determined empirically by placing a catalyst long in one of the grooves, extending it through the slit, closing the slit until it just clamps the catalyst long, and then opening up the slit slightly until the catalyst slides freely through the slit without binding. The width of the slit at which it just binds the catalyst long is defined herein as being effectively equal to the diameter of the catalyst long. This effective width may be measured from any convenient point of the groove, i.e., from the peaks or from the valleys and will be considered effectively equal to the diameter of the catalyst longs when the longs are just bound in the slit.

Cylindrical rollers 11 and 12 are mounted on frame 10 and are rotated in opposite directions by suitable means 14. As noted hereinbefore catalyst strands 25 are fed from chute 13 into the nip of rollers 11 and 12 and as catalyst strands 25 are passed through or between rollers 11 and 12 said strands are broken or severed into lengths to produce catalyst pellets of a preselected length.

The configuration of feed chute 13 may be modified in a number of ways. It is important to note that its function is simply to feed catalyst strands 25 at right angles into the nip of rollers 11 and 12. Means are provided for positioning feed chute 13 over the rollers so that the slit is parallel with the nip.

It is important that the respective surfaces of rollers 11 and 12 be of a specific character. More particularly, the surface of roller 11 is convoluted or otherwise scored or indented with ridges and valleys having preselected dimensions. In lieu of such convolutions, a very excellent surfacing material is a wire mesh 22 having the proper dimensions which is applied as a cover to roller 11. The surface of roller 12 is compressible, which surface may suitably be a cover of rubber, thermoplastic material or the like.

A very suitable apparatus for sizing catalyst strands is made using the following materials and dimensions; however, it will be appreciated that these dimensions, materials, and the like are merely illustrative and many modifications and adaptations will become apparent to one skilled in the catalyst are without departing from the spirit and scope of the present invention.

In general, a suitable frame 10 of about 30 inches square can be fabricated of 8"—11.5 pound channel iron. Attached to 10 is preferably a base stand for support of a motor/gear reducer 14 for driving rollers 11 and 12. A ¾ HP motor reduced to 35 rpm was found to be an effective speed using a ¾ chain drive and ¾" R.C. × 18 Tooth Drive, idler and roll sprockets. Rollers 11 and 12 can be rolls of approximately 5½" diameter and 24" in length with roller 12 having a 1/16" thick vinyl or rubber cover or surface and roller 11 having a 2 to 5 square mesh per linear inch of wire cover. A very suitable wire cover is a wire mesh of from about 2 ¼ to 4 square meshes per linear inch, said mesh wire having a diameter between about 0.040 to 0.100 inches, preferably 0.045 to 0.090 inch.

Feed chute 13 is preferably equipped with a spreader means (not shown) and a vibrator 21 for aligning catalyst strands 25 in ¼" "VEE" corrugations in surface 15.

In summary, in actual operation the "longs" are fed into a corrugated, vibrating chute 13 which properly aligns strands 25 for feeding to rollers 11 and 12. Proper alignment is believed to significantly contribute to the reduction of fines.

In passing through rollers 11 and 12, strands 25 are broken by the bite of the wire mesh surfacing of roller 11 against the compressible surfacing of roller 12 to produce catalyst pellets of correct length which drop from the sizer rollers onto a conveyor (not shown) which transport the pellets for further handling.

I claim as my invention:

1. An apparatus for producing catalyst pellets of uniform size from brittle catalyst longs comprising
    1. a frame
    2. two revolvable cylindrical rolls attached to said frame wherein one roll has a compressible surface and the other roll has a convoluted surface of preselected dimensions,
    3. means for driving said rolls in opposite directions to form a nip therebetween, and
    4. an open top hopper having two opposing sides sloping inwardly from the top and terminating at the bottom in a slit, said open top hopper being positioned over the rollers so that the slit is parallel with the nip, said slit having an effective width slightly larger than the diameter of the longs whereby the catalyst longs can pass through the slit without binding and a length equal to or less than the length of the nip, an inward surface of the sloping side having grooves starting at the top and terminating at the slit, the grooves being parallel to each other, spaced apart a distance slightly more than the diameter of the longs, and perpendicular to the line made by the nip.

2. An apparatus of claim 1, wherein the compressible surface is a rubber surface.

3. An apparatus of claim 1, wherein the compressible surface is a plastic surface.

4. An apparatus of claim 1, wherein the convoluted surface is an embossed surface.

5. An apparatus of claim 1, wherein the convoluted surface is a wire mesh cover on the roll.

* * * * *